(12) United States Patent
Okumura

(10) Patent No.: US 12,084,037 B2
(45) Date of Patent: Sep. 10, 2024

(54) CONTROL DEVICE

(71) Applicant: TOYOTA JIDOSHA KABUSHIKI KAISHA, Toyota-shi (JP)

(72) Inventor: Shin Okumura, Toyota-shi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 38 days.

(21) Appl. No.: 17/981,663

(22) Filed: Nov. 7, 2022

(65) Prior Publication Data

US 2023/0202449 A1 Jun. 29, 2023

(30) Foreign Application Priority Data

Dec. 2, 2021 (JP) ................. 2021-196180

(51) Int. Cl.
*B60W 10/08* (2006.01)
*B60W 10/06* (2006.01)
*F02N 11/08* (2006.01)

(52) U.S. Cl.
CPC ......... *B60W 10/06* (2013.01); *F02N 11/0807* (2013.01)

(58) Field of Classification Search
CPC ......... Y02T 10/70; Y02T 10/62; Y02T 10/12; F02N 11/0866; F02N 11/04; F02N 11/0807; F02N 11/0862; F02N 2200/063; B60L 58/18; B60L 2240/54; B60L 2240/545; B60L 2240/547; B60L 2240/549; H02J 2310/48; B60W 40/08; B60W 10/06; B60W 10/08; B60W 10/04
See application file for complete search history.

(56) References Cited

U.S. PATENT DOCUMENTS

| | | | |
|---|---|---|---|
| 2011/0197844 A1 | 8/2011 | Matsubara | |
| 2014/0203759 A1 | 7/2014 | Sugiyama | |
| 2018/0252774 A1* | 9/2018 | Ciaccio | ............... G01R 31/388 |
| 2019/0140225 A1* | 5/2019 | Inoue | .................. H01M 10/441 |
| 2019/0249615 A1 | 8/2019 | Matsumura et al. | |
| 2020/0361284 A1* | 11/2020 | Ragazzi | ............. B60H 1/00385 |

FOREIGN PATENT DOCUMENTS

| | | | | |
|---|---|---|---|---|
| CN | 102756728 A | * | 10/2012 | ............. B60K 6/485 |
| CN | 108011916 A | * | 5/2018 | ............. B60L 50/71 |
| CN | 108545076 A | * | 9/2018 | ............. B60W 20/20 |
| CN | 108725423 A | * | 11/2018 | ............. B60L 50/61 |
| CN | 112572345 A | * | 3/2021 | |

(Continued)

*Primary Examiner* — George C Jin
*Assistant Examiner* — Teuta B Holbrook
(74) *Attorney, Agent, or Firm* — Dinsmore & Shohl LLP

(57) ABSTRACT

The control device is a control device applied to the vehicle. The control device is capable of performing a starting process to start the internal combustion engine by driving either the motor generator or the starter upon receipt of a starting request. The control device starts the internal combustion engine by driving the starter when, in the starting process, the starting request is based on remote operation from the communication device outside the vehicle. On the other hand, in the starting process, the control device starts the internal combustion engine by driving the motor generator if it receives a starting request while there is an occupant in the vehicle.

5 Claims, 3 Drawing Sheets

(56) References Cited

FOREIGN PATENT DOCUMENTS

| | | | |
|---|---|---|---|
| DE | 102014209252 A1 * | 11/2015 | ............ H02J 7/1446 |
| FR | 2840654 A1 * | 12/2003 | ............... B60K 6/48 |
| JP | 2011-162140 A | 8/2011 | |
| JP | 2014-140268 A | 7/2014 | |
| JP | 2014-141209 A | 8/2014 | |
| JP | 2014231291 A * | 12/2014 | |
| JP | 6552625 B2 | 7/2019 | |
| JP | 2019-137270 A | 8/2019 | |
| WO | 2014/115015 A1 | 7/2014 | |
| WO | 2014/208028 A1 | 12/2014 | |
| WO | 2016/116215 A1 | 7/2016 | |

* cited by examiner

CONTROL DEVICE

CROSS-REFERENCE TO RELATED APPLICATION

This application claims priority to Japanese Patent Application No. 2021-196180 filed on Dec. 2, 2021, incorporated herein by reference in its entirety.

BACKGROUND

1. Technical Field

The present disclosure relates to a control device.

2. Description of Related Art

A vehicle according to Japanese Unexamined Patent Application Publication No. 2019-137270 (JP 2019-137270 A) includes a motor generator capable of applying torque to a crankshaft of an internal combustion engine, a starter capable of starting the internal combustion engine, and a control device. The control device starts the internal combustion engine when a starting request for the internal combustion engine is received. At this time, the control device starts the internal combustion engine by driving either the motor generator or the starter. Specifically, when the starting request is received as a driver of the vehicle turns on an ignition switch, the control device starts the internal combustion engine with the starter. On the other hand, when an automatic starting request is received after the internal combustion engine is temporarily stopped, the control device starts the internal combustion engine with the motor generator.

SUMMARY

In the disclosure according to JP 2019-137270 A, it is assumed that an occupant is present in a vehicle. On the other hand, an internal combustion engine may be started by a remote operation from a communication device. In the disclosure according to JP 2019-137270 A, there is still room for study in whether the motor generator or the starter is used to start the internal combustion engine when a starting request is received according to the remote operation from the communication device.

A control device according to a first aspect of the present disclosure is a control device that is applied to a vehicle including: an internal combustion engine that includes a crankshaft as an output shaft; a motor generator that is able to apply torque to the crankshaft; a starter for starting the internal combustion engine; a battery for supplying electric power to the motor generator and the starter; and a communicator that is able to communicate wirelessly with an external communication device, in which the control device is able to execute a starting process for starting the internal combustion engine by driving either the motor generator or the starter when receiving a starting request; and the control device is configured to start the internal combustion engine by driving the starter in the starting process when the starting request is based on a remote operation from the communication device outside the vehicle, and is configured to start the internal combustion engine by driving the motor generator in the starting process when the starting request is received in a state where an occupant is present in the vehicle.

The starter has a lower degree of quietness at the time of driving than the motor generator. In addition, the starter consumes less electric power in the battery required to start the internal combustion engine than the motor generator. When the starting request by the remote operation is received, there is a high possibility that the occupant is not present in the vehicle. In some embodiments, in a state where the occupant is not present in the vehicle, a reduction in electric power consumption in the battery may be prioritized over quietness. In some embodiments, on the other hand, in a state where the occupant is present in the vehicle, the degree of quietness at the time of driving may be high.

According to the above-described configuration, when the starting request is based on the remote operation, the control device starts the internal combustion engine with the starter, assuming that the occupant is not present in the vehicle. That is, according to the above configuration, the control device selects the starter with small electric power consumption as a way of starting the internal combustion engine. As described above, starting the internal combustion engine with the starter is suitable for a situation where the occupant is not present in the vehicle. When the starting request is received in a state where the occupant is present in the vehicle, the control device starts the internal combustion engine by driving the motor generator. That is, according to the above-described configuration, the control device selects the motor generator with the high degree of quietness as a way of starting the internal combustion engine. As described above, starting the internal combustion engine with the motor generator is suitable for a situation where the occupant is present in the vehicle.

In the control device according to the first aspect, the control device may be configured to start the internal combustion engine with the starter in the starting process, regardless of whether the occupant is present in the vehicle, when the vehicle satisfies a prohibition condition set in advance. According to such a configuration, when the vehicle satisfies the prohibition condition, the control device starts the internal combustion engine with the starter with small electric power consumption. Therefore, the internal combustion engine can be started more reliably.

In the control device according to the first aspect, the vehicle includes, as the battery, a first battery for supplying electric power to the motor generator, and a second battery for supplying electric power to the starter; and the prohibition condition may include that a charge capacity of the first battery is equal to or less than a specified value set in advance. According to such a configuration, it is possible to suppress use of the motor generator in a state where the charge capacity of the first battery is small. That is, it is possible to suppress overdischarge of the first battery.

In the control device according to the first aspect, the vehicle further includes a temperature sensor for detecting an engine temperature of the internal combustion engine; and the prohibition condition may include that the engine temperature is equal to or lower than a specified temperature set in advance. According to such a configuration, when the engine temperature is low, that is, when the viscosity of the lubricating oil of the internal combustion engine is high and a large amount of energy is required to start the internal combustion engine, the internal combustion engine is started with the starter. Therefore, even when the engine temperature is low, the internal combustion engine can be reliably started without failing to start the internal combustion engine.

In the control device according to the first aspect, the control device may be configured to be able to further execute a determination process of determining whether the starting request is based on the remote operation from the communication device after a specified time set in advance has elapsed since receiving the starting request.

In the above configuration, it is assumed that the control device receives the starting request based on the remote operation from the communication device. At this time, due to a processing delay in the control device, a synchronization deviation of various processes, and the like, it may not be determined whether the starting request is based on the remote operation from the communication device at the time when the control device receives the starting request. In this case, when the control device determines whether the starting request is based on the remote operation from the communication device at the time when the control device receives the starting request, it may be erroneously determined that the starting request is not based on the remote operation. In this regard, according to the above-described configuration, the control device determines whether the starting request is based on the remote operation from the communication device after a specified time set in advance has elapsed since receiving the starting request. Therefore, even when a processing delay or the like occurs in the control device, erroneous determination is unlikely to be made in determining whether the starting request is based on the remote operation from the communication device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
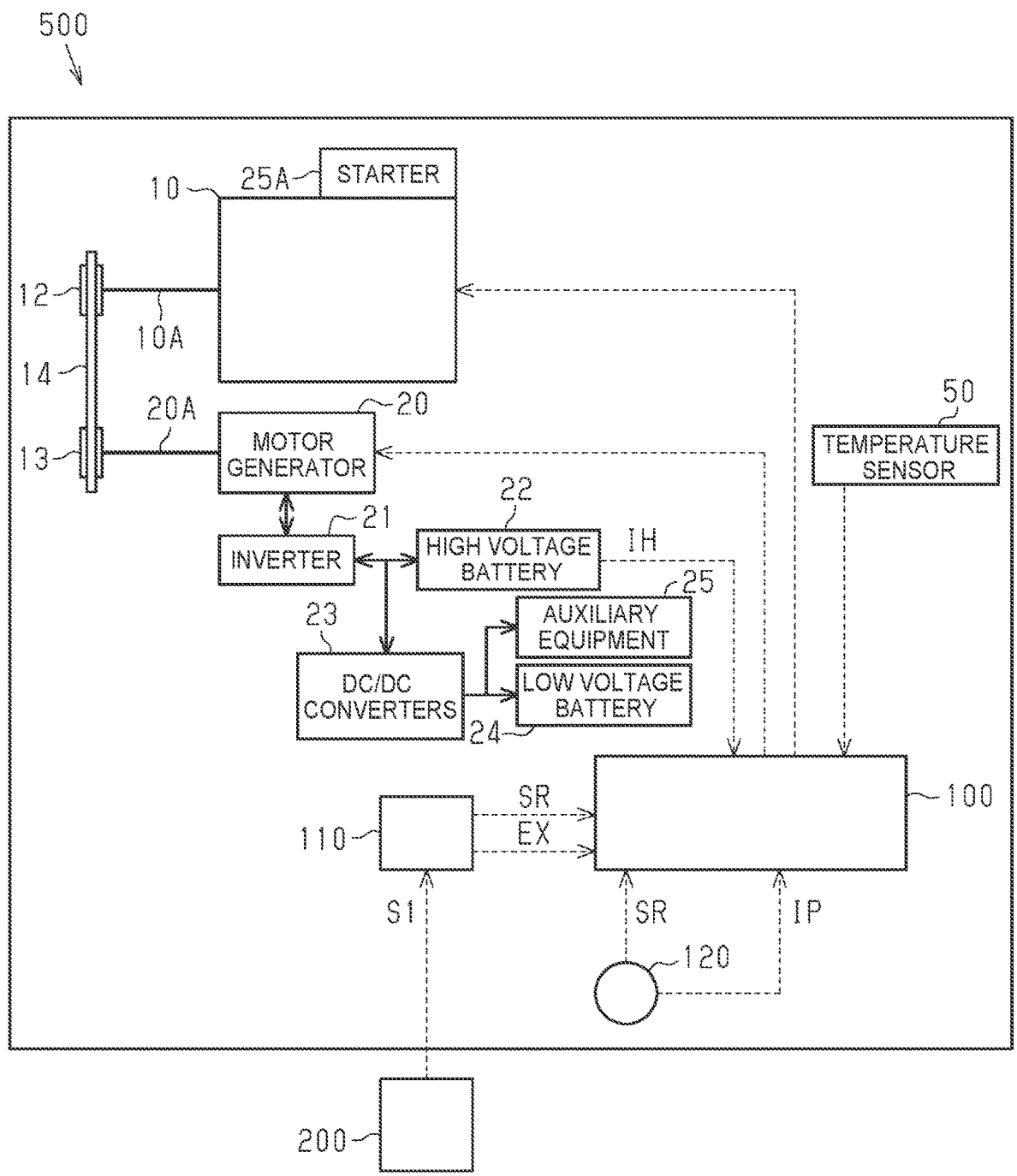
FIG. 1 is a schematic configuration diagram of a hybrid system of a vehicle in the first embodiment.

Hereinafter, embodiments of the present disclosure will be described. As shown in FIG. 1, the vehicle 500, as a driving source, an internal combustion engine 10, and a motor generator 20. The internal combustion engine 10 has a crankshaft 10A as an output shaft. Motor generator 20 has an output shaft 20A. The motor generator 20 is a so-called three-phase AC motor.

The vehicle 500 includes a first pulley 12, a second pulley 13, and a transmission belt 14. The first pulley 12 is coupled to the crankshaft 10A. The second pulley 13 is coupled to the output shaft 20A. The transmission belt 14 is hung on the first pulley 12 and the second pulley 13. That is, the motor generator 20 is connected to the crankshaft 10A of the internal combustion engine 10 through a second pulley 13, a transmission belt 14, and a first pulley 12. Although not shown, the crankshaft 10A of the internal combustion engine 10, a belt, a pulley, a gear, via a chain or the like, and is also connected to a compressor or the like of a hydraulic pump or an air conditioner for generating hydraulic pressure.

When the motor generator 20 functions as a generator, the torque on the crankshaft 10A of the internal combustion engine 10 is transmitted to the output shaft 20A through the first pulley 12, the transmission belt 14, and the second pulley 13. Then, in response to the rotation of the output shaft 20A, the motor generator 20 generates electricity. On the other hand, if the motor generator 20 functions as an electric motor, the motor generator 20 provides torque to the second pulley 13. Then, the torque is transmitted to the crankshaft 10A of the internal combustion engine 10 through the transmission belt 14 and the first pulley 12. Thus, the motor generator 20 is capable of applying torque to the crankshaft 10A of the internal combustion engine 10. Incidentally, when the internal combustion engine 10 is stopped, by causing the motor generator 20 to function as an electric motor, the internal combustion engine 10 is started.

The vehicle 500 includes a high-voltage battery 22 as a first battery and a low-voltage battery 24 as a second battery. Further, the vehicle 500 includes an inverter 21, a DC/DC converter 23, and an auxiliary machine 25.

The motor generator 20 is connected to the high voltage battery 22 via an inverter 21. Inverter 21 is a so-called bi-directional inverter. That is, the inverter 21 converts the AC voltage generated by the motor generator 20 into a DC voltage and outputs it to the high-voltage battery 22. Further, the inverter 21 converts the DC voltage output by the high-voltage battery 22 into an AC voltage and outputs it to the motor generator 20.

The high voltage battery 22 is a 48 V lithium ion battery. The high voltage battery 22 supplies electric power to the motor generator 20 when the motor generator 20 functions as an electric motor. The high-voltage battery 22 is charged by receiving electric power from the motor generator 20 when the motor generator 20 functions as a generator.

The motor generator 20 is connected to DC/DC converter 23 via an inverter 21. DC/DC converters 23 are also connected to the high voltage battery 22. DC/DC converter 23 outputs the DC voltage output from the inverter 21 and the high-voltage battery 22 in step-down to a voltage within the range of 15 V from 12 V.

A low voltage battery 24 is connected to DC/DC converters 23. The low voltage battery 24 is a 12 V lead-acid battery with a lower voltage than the high voltage battery 22. The low-voltage battery 24 outputs a DC voltage of 12 V when the output voltage of DC/DC converter 23 is 12 V. Low voltage battery 24, even when DC/DC converter 23 is not driven, and outputs a DC voltage of 12 V. The low-voltage battery 24 is also charged by receiving electric power from DC/DC converter 23 when the output voltage of DC/DC converter 23 is greater than the open-circuit voltage of the low-voltage battery 24.

DC/DC converter 23 and the low-voltage battery 24, various auxiliary machines 25 are connected. Auxiliary unit 25 is, for example, a headlamp of the vehicle 500, a direction indicating lamp, a light relationship such as an indoor lamp, and a car navigation device, a vehicle cabin equipment such as a speaker. The auxiliary machine 25 receives electric power from the low voltage battery 24 when DC/DC converter 23 is not being driven. The auxiliary machine 25 receives electric power from DC/DC converter 23 when the output voltage of DC/DC converter 23 is greater than the open-circuit voltage of the low-voltage battery 24.

Further, DC/DC converter 23 and the low-voltage battery 24, as one of the auxiliary machine 25 described above, a starter 25A for starting the internal combustion engine 10 is connected. The starter 25A is a DC motor. The output shaft of the starter 25A is connected to the crankshaft 10A of the internal combustion engine 10 via a gear (not shown). The starter 25A is powered by a low voltage battery 24 and powered by DC/DC converters 23.

Vehicle 500 is provided with a temperature sensor 50 for detecting the engine temperature of the internal combustion engine 10. The temperature sensor 50 is located at the outlet of a water jacket partitioned into the internal combustion engine 10. That is, the temperature sensor 50 detects the temperature of the coolant discharged from the water jacket of the internal combustion engine 10 as the engine temperature of the internal combustion engine 10.

The vehicle 500 includes a communicator 110, an ignition switch 120, and a control device 100. The communicator 110 can wirelessly communicate with the communication device 200 outside the vehicle 500. The communication device 200 is, for example, an electronic key of the vehicle 500, a smartphone, or the like. The electronic key is a device that can instruct locking, unlocking, opening and closing of a door of the vehicle 500, starting and stopping of the internal combustion engine 10, and the like by wireless communication.

The communicator 110 is capable of receiving a signal S1 from the communication device 200 for instructing the start of the internal combustion engine 10. In response to receiving the signal S1, the communicator 110 transmits a starting request SR. The starting request SR includes information indicating that the internal combustion engine 10 is to be started. In addition, the communicator 110 transmits the remote signal EX in association with the starting request SR. The remote signal EX indicates that the starting request SR is a signal based on remote operation from the communication device 200 outside the vehicle 500.

The communicator 110 is capable of receiving a signal from the communication device 200 for instructing the stop of the internal combustion engine 10. The communicator 110 transmits a stop request in response to receiving a signal for instructing the stop of the internal combustion engine 10. The stop request includes information indicating that the internal combustion engine 10 is stopped.

The ignition switch 120 is mounted in the vehicle cabin of the vehicle 500. The ignition switch 120 may be referred to as, for example, a start switch, a system-on switch, or the like. Ignition switch 120 is, for example, a push button switch. When the ignition switch 120 is operated with the internal combustion engine 10 stopped and the brake pedal (not shown) depressed, the ignition switch 120 issues a starting request SR. The starting request SR transmitted by the ignition switch 120 is the same type as the starting request SR transmitted by the communicator 110. In addition, the ignition switch 120 transmits the starting request SR and transmits the occupant signal IP in association with the starting request SR. The occupant signal IP indicates that the starting request SR has been transmitted with an occupant in the vehicle 500.

When the ignition switch 120 is operated while the internal combustion engine 10 is being driven, the ignition switch 120 transmits a stop request. The stop request includes information indicating that the internal combustion engine 10 is stopped.

The control device 100 controls the internal combustion engine 10, the motor generator 20, the starter 25A, and the like. The control device 100 receives the starting request SR transmitted from the communicator 110 or the ignition switch 120. The control device 100 receives a remote signal EX emanating from the communicator 110. The control device 100 receives an occupant signal IP emanating from the ignition switch 120. The control device 100 selects the way for starting the internal combustion engine 10 depending on whether the signal associated with the starting request SR is a remote signal EX or an occupant signal IP.

In addition, the control device 100 receives a stop request transmitted from the communicator 110 or the ignition switch 120. The control device 100 stops the driving of the internal combustion engine 10 in response to the reception of the stop request.

The control device 100 receives a signal from the high voltage battery 22 indicating the state information IH of the high voltage battery 22. The state information IH of the high-voltage battery 22 is an output voltage value of the high-voltage battery 22, an output current value, a temperature, and the like. The control device 100 calculates the charge capacity of the high-voltage battery 22 based on the state information IH of the high-voltage battery 22. In this embodiment, the charge capacity of the high-voltage battery 22, the amount of electric power charged in the high-voltage battery 22 when the state information IH is input is shown as a ratio of the amount of electric power of the full charge of the high-voltage battery 22, for example, a percentage (%). Although not shown, the control device 100 receives a signal indicating the state information of the low-voltage battery 24 from the low-voltage battery 24. The control device 100 calculates the charge capacity of the low-voltage battery 24, etc. based on the state information of the low-voltage battery 24.

Note that the control device 100 may be configured as a circuitry including one or more processors that execute various processes in accordance with a computer program (software). In addition, the control device 100 may be configured as a circuit including one or more dedicated hardware circuits, such as an application-specific integrated circuit (ASIC), or a combination thereof, for executing at least some of the various processes. The processor includes a CPU and a memory such as a RAM or a ROM. The memory stores a program code or a command configured to cause the CPU to execute the process. The memory, that is, a computer-readable medium, includes any available medium accessible by a general purpose or a dedicated computer.

Engine Start Control that can be Executed by Control Device

Hereinafter, the engine start control executed by the control device 100 will be described. When the system of the vehicle 500 is changed from the off state to the on state, the control device 100 executes the following engine start control only once. The on-state of the system refers to a state in which electric power is supplied to the control device 100 and the associated electronic devices.

Figure 2:
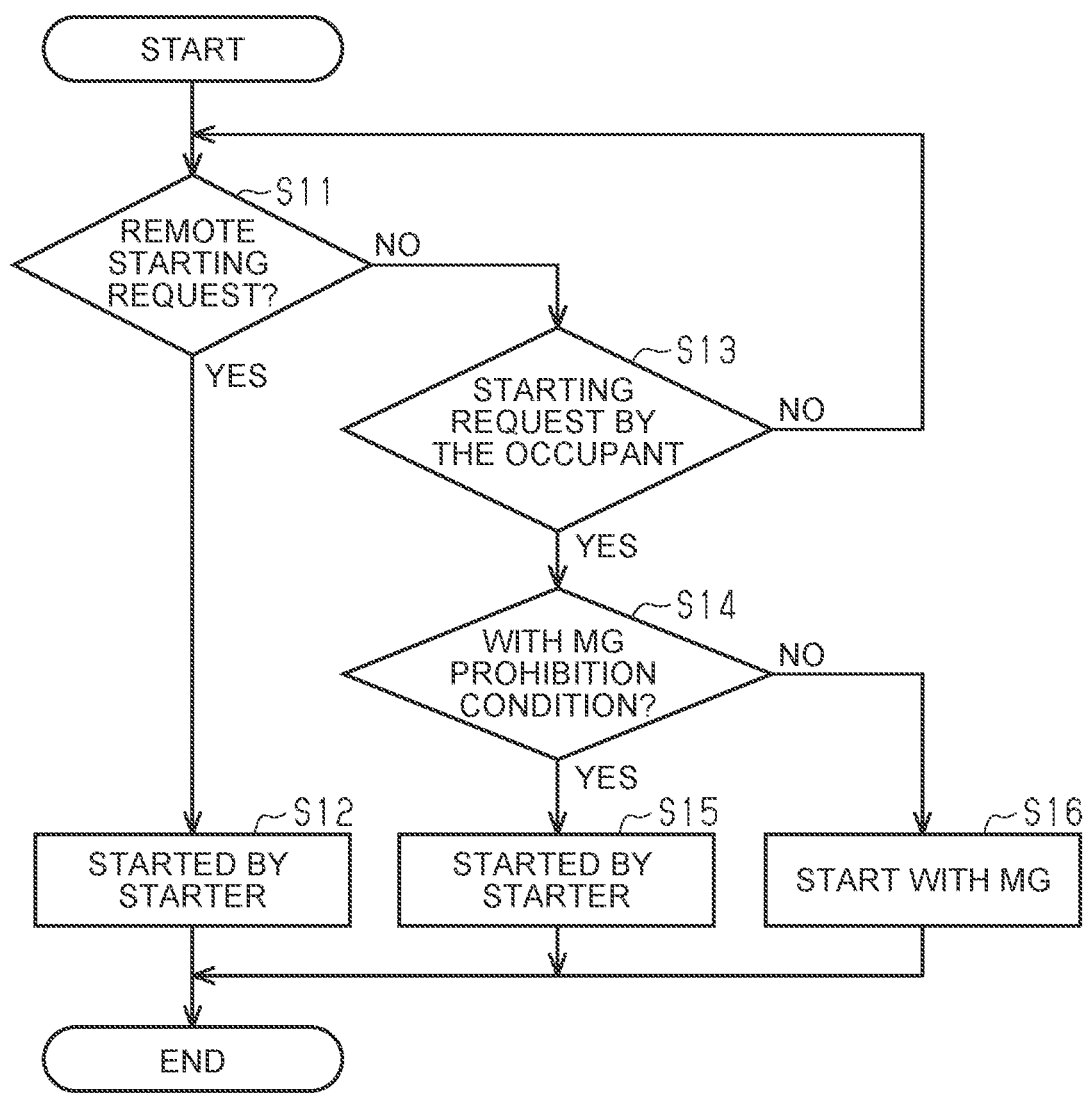
FIG. 2 is a flowchart of engine start control executed by the control device according to the first embodiment.

As illustrated in FIG. 2, when the engine start control is executed, the control device 100 first executes the process of step S11. In step S11, the control device 100 determines whether there is a starting request for the internal combustion engine 10 based on remote operation from the communication device 200 outside the vehicle 500. That is, the control device 100 determines whether or not the starting request SR has been received. The control device 100 also determines whether the signal associated with the received starting request SR is a remote signal EX. When the starting request SR is received and the remote signal EX is associated (S11: YES), the process of the control device 100 proceeds to step S12.

In step S12, the control device 100 executes a starting process. Specifically, the control device 100 starts the internal combustion engine 10 by driving the starter 25A. Thereafter, the control device 100 ends the engine start control.

On the other hand, if a negative determination is made in step S11 (S11: NO), the process of the control device 100 proceeds to step S13. In step S13, the control device 100 determines whether there is a starting request for the internal combustion engine 10 in a state where there is an occupant in the vehicle 500. That is, the control device 100 determines whether or not the starting request SR has been received. The control device 100 also determines whether the signal associated with the received starting request SR is an occupant signal IP. If the starting request SR has not been received (S13: NO), the process of the control device 100 proceeds to step S11. On the other hand, when the starting request SR is received and the occupant signal IP is associated (S13: YES), the process of the control device 100 proceeds to step S14.

In step S14, the control device 100 determines whether or not a predetermined prohibition condition for driving the motor generator 20 is satisfied. The prohibition condition is, for example, "the charge capacity of the high-voltage battery 22 is equal to or less than a specified value X set in advance". The specified value X is defined as the value obtained by adding the charge capacity required to start the internal combustion engine 10 by driving the motor generator 20 to the lower limit value of the charge capacity that does not cause irreversible deterioration to the high-voltage battery 22. In step S14, the control device 100 calculates the charge capacity of the high-voltage battery 22 based on the state information IH of the high-voltage battery 22. Then, the control device 100 determines whether or not the charge capacity is equal to or less than the specified value X. If the charge capacity of the high-voltage battery 22 is equal to or less than the specified value X (S14: YES), the process of the control device 100 proceeds to step S15.

In step S15, the control device 100 executes a starting process. Specifically, the control device 100 starts the internal combustion engine 10 by driving the starter 25A. That is, if the prohibition condition is met in step S14, the starter 25A starts the internal combustion engine 10, even if the occupant signal IP is associated with the starting request SR. Thereafter, the control device 100 ends the engine start control.

On the other hand, if a negative determination is made in step S14 (S14: NO), the process of the control device 100 proceeds to step S16. In step S16, the control device 100 executes a starting process. Specifically, the control device 100 starts the internal combustion engine 10 by driving the motor generator 20. Thereafter, the control device 100 ends the engine start control.

Operation of First Embodiment

Suppose that an occupant outside the vehicle 500 operated the communication device 200 to instruct the start of the internal combustion engine 10. In this case, the communication device 200 transmits a signal S1. Upon receiving the signal S1, the communicator 110 emits a starting request SR and a remote signal EX. The control device 100 drives the starter 25A to start the internal combustion engine 10 upon receipt of a starting request SR and a remote signal EX.

On the other hand, it is assumed that the occupant entered the vehicle 500 and operated the ignition switch 120 to instruct the start of the internal combustion engine 10. In this case, the control device 100 receives the starting request SR and the occupant signal IP. If the prohibition condition for driving the motor generator 20 described above is not satisfied, the control device 100 drives the motor generator 20 to start the internal combustion engine 10.

Effect of First Embodiment (1-1) In the first embodiment, if the remote signal EX is associated with the starting request SR control device 100 has received, it is likely that there is no occupant in the vehicle 500. In some embodiments, in the absence of occupants in the vehicle 500, electric power consumption savings is prioritized over quietness. Then, the starter 25A is less quiet during driving than the motor generator 20. On the other hand, the starter 25A consumes less electric power to start the internal combustion engine 10 than the motor generator 20. According to the first embodiment, when the starting request SR is based on remote operation, the control device 100 starts the internal combustion engine 10 in the starter 25A assuming that the occupant is not in the vehicle 500. That is, the control device 100 selects a low electric power consuming starter 25A as a way of starting the internal combustion engine 10. As noted above, the start-up of the internal combustion engine 10 by the starter 25A is suitable for situations where the occupant is not in the vehicle 500.

(1-2) In the configuration of the first embodiment, when the occupant signal IP is associated with the starting request SR received by the control device 100, there is a high possibility that there is an occupant in the vehicle 500. In some embodiments, in the presence of occupants in the vehicle 500, quietness is prioritized over saving electric power consumption. Then, the motor generator 20, as compared with the starter 25A, the electric power consumed for starting the internal combustion engine 10 is large. On the other hand, the motor generator 20 is quieter at the time of driving compared to the starter 25A. According to the first embodiment, when the starting request SR is received with an occupant in the vehicle 500, the control device 100 starts the internal combustion engine 10 by driving the motor generator 20. That is, the control device 100 selects the motor generator 20 with high quietness as a way of starting the internal combustion engine 10. As noted above, the start-up of the internal combustion engine 10 by the motor generator 20 is suitable for situations where an occupant is in the vehicle 500.

(1-3) In the first embodiment, the control device 100 starts the internal combustion engine 10 by a starter 25A when the vehicle 500 satisfies the prohibition condition, even if the occupant signal IP is associated with the starting request SR. That is, the control device 100 starts the internal combustion engine 10 by a starter 25A whether or not there is an occupant in the vehicle 500. According to this arrangement, when the vehicle 500 meets the prohibition condition, the internal combustion engine 10 is started with a less electric power consuming and reliable starter 25A of successful start-up of the internal combustion engine 10. Therefore, in the first embodiment, the internal combustion engine 10 can be started more reliably.

(1-4) In the first embodiment, the prohibition condition includes that the charge capacity of the high-voltage battery 22 is equal to or less than a specified value X set in advance. According to this configuration, it is possible to prevent the use of the motor generator 20 in a state where the charge capacity of the high-voltage battery 22 is small. That is, it is possible to prevent the irreversible deterioration in the high-voltage battery 22 due to overdischarge of the high-voltage battery 22.

Second Embodiment

Next, a second embodiment of the control device 100 will be described. Hereinafter, description of the same configuration as that of the first embodiment will be simplified or omitted.

In the second embodiment, the control device 100 controls the internal combustion engine 10, the motor generator 20, and the starter 25A and the like. The control device 100 receives the starting request SR transmitted from the communicator 110 or the ignition switch 120. The control device 100 receives a remote signal EX emanating from the communicator 110. On the other hand, in the second embodiment, the ignition switch 120 does not emit an occupant signal IP. That is, the control device 100 does not receive the occupant signal IP originating from the ignition switch 120. The control device 100 selects the way for starting the internal combustion engine 10 according to whether or not the remote signal EX is associated with the starting request SR.

Hereinafter, the engine start control executed by the control device 100 will be described. When the system of the vehicle 500 is changed from the off state to the on state, the control device 100 executes the following engine start control only once.

Figure 3:
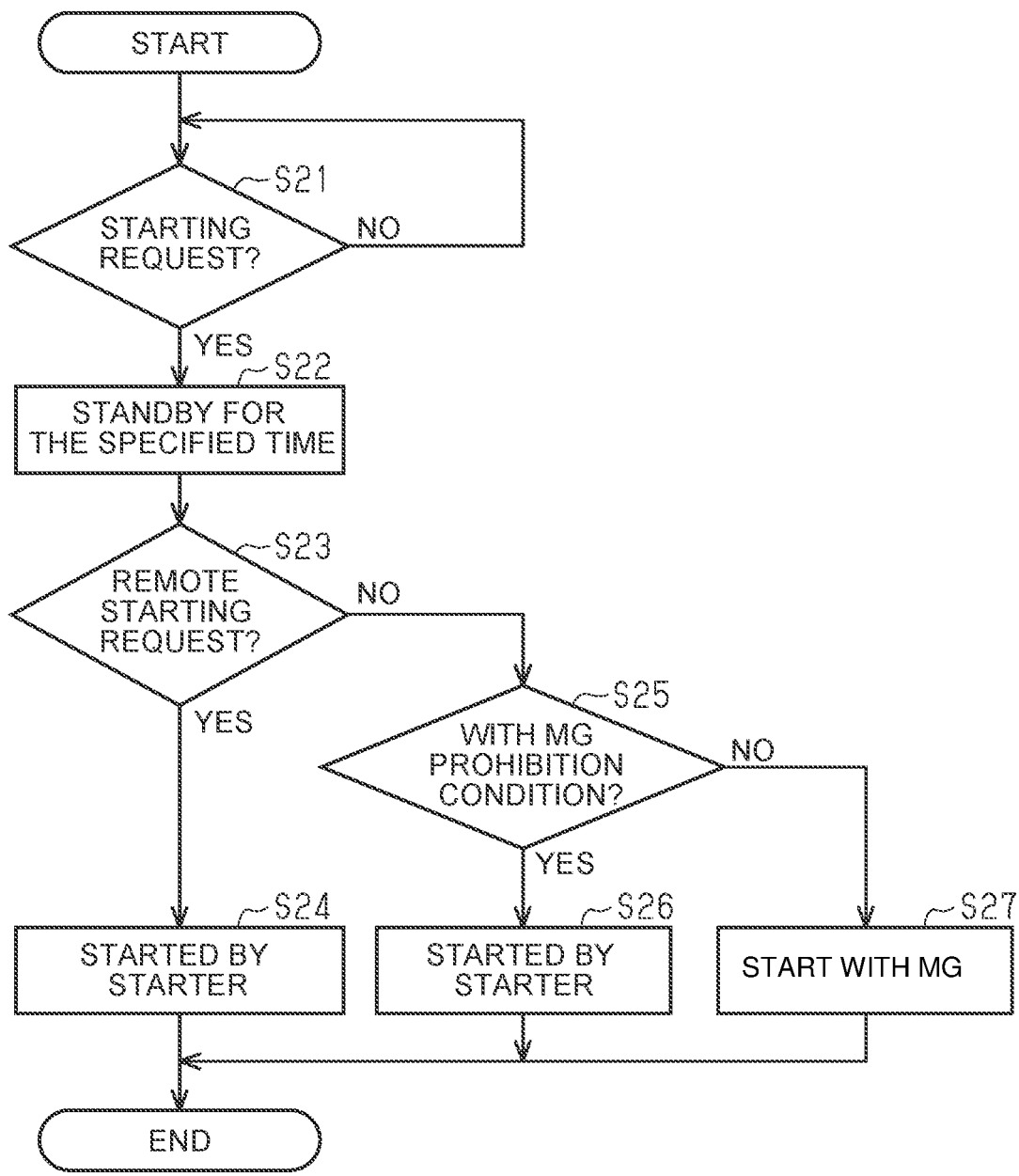
FIG. 3 is a flowchart of engine start control executed by the control device according to the second embodiment.

As illustrated in FIG. 3, when the engine start control is executed, the control device 100 first executes the process of step S21. In step S21, the control device 100 determines whether there is a starting request for the internal combustion engine 10. That is, the control device 100 determines whether or not the starting request SR has been received. If a negative determination is made in step S21 (S21: NO), the control device 100 executes the process of step S21 again. If an affirmative determination is made in step S21 (S21: YES), the process of the control device 100 proceeds to step S22.

In step S22, the control device 100 waits for a specified time set in advance. The specified time is determined in advance as a time until a processing delay in the control device 100, a synchronization deviation of various processing, and the like are eliminated. For example, the specified time may be from several milliseconds to several tens of milliseconds. After the specified time has elapsed, the processing of the control device 100 proceeds to step S23.

In step S23, the control device 100 executes a determination process. Specifically, the control device 100 determines whether the remote signal EX is associated with the received starting request SR. When the starting request SR is received and the remote signal EX is associated (S23: YES), the process of the control device 100 proceeds to step S24.

In step S24, the control device 100 executes a starting process. Specifically, the control device 100 starts the internal combustion engine 10 by driving the starter 25A. Thereafter, the control device 100 ends the engine start control.

On the other hand, if a negative determination is made in step S23 (S23: NO), the process of the control device 100 proceeds to step S25. In step S25, the control device 100, since it did not receive the remote signal EX, the starting request SR is determined to have been performed in a state where an occupant in the vehicle 500. Then, the control device 100 determines whether or not a predetermined prohibition condition for driving the motor generator 20 is satisfied. The prohibition condition is the same as that of the first embodiment. That is, in step S25, the control device 100 calculates the charge capacity of the high-voltage battery 22 based on the state information IH of the high-voltage battery 22. Then, the control device 100 determines whether or not the charge capacity is equal to or less than the specified value X. If the charge capacity of the high-voltage battery 22 is equal to or less than the specified value X (S25: YES), the process of the control device 100 proceeds to step S26.

In step S26, the control device 100 executes a starting process. Specifically, the control device 100 starts the internal combustion engine 10 by driving the starter 25A. That is, if the prohibition condition is met in step S25, the internal combustion engine 10 is started by the starter 25A regardless of whether there is an occupant in the vehicle 500. Thereafter, the control device 100 ends the engine start control.

On the other hand, in a case where a negative determination is made in step S25 (S25: NO), the processing of the control device 100 proceeds to step S27. In step S27, the control device 100 executes a starting process. Specifically, the control device 100 starts the internal combustion engine 10 by driving the motor generator 20. Thereafter, the control device 100 ends the engine start control.

Effect of Second Embodiment

Next, effects of the second embodiment will be described. The control device 100 of the second embodiment exhibits the following effects in addition to the effects (1-1), (1-3), and (1-4) of the first embodiment.

(2-1) In the second embodiment, if the remote signal EX is not associated with the starting request SR received by the control device 100, it is likely that there is an occupant in the vehicle 500. In this case, according to the second embodiment described above, the control device 100 starts the internal combustion engine 10 by driving the motor generator 20. That is, the control device 100 selects a quiet motor generator 20 suitable for situations where an occupant is in the vehicle 500 as a way of starting the internal combustion engine 10.

(2-2) In the second embodiment, the control device 100, due to such synchronization deviation of the processing delay and various processes, may not be able to receive the remote signal EX when the control device 100 receives the starting request SR. In this case, when the control device 100 determines whether or not the starting request SR is based on the remote operation from the communication device 200 at the time when the starting request SR is received, there is a possibility that the starting request SR is erroneously determined not to be based on the remote operation. That is, the control device 100 may erroneously determine that the starting request SR is a starting request SR in a state in which an occupant is present in the vehicle 500.

In the second embodiment, the control device 100 determines whether or not the remote signal EX has been received after the specified time has elapsed since the reception of the starting request SR. That is, the control device 100 determines whether or not the starting request SR is based on a remote operation from the communication device 200 after a specified time has elapsed since the starting request was received. Therefore, even if a processing delay or the like in the control device 100 occurs, erroneous determination is unlikely to occur in determining whether or not the starting request SR is based on remote operation from the communication device 200.

Example of Change

The above-described embodiments can be modified as follows. The above-described embodiments and the following modification examples can be combined in a range that is not technically contradictory.

The aspect of the connection between the internal combustion engine 10 and the motor generator 20 is not limited to the above-described embodiment. For example, between the internal combustion engine 10 and the motor generator 20, in addition to the first pulley 12, the transmission belt 14, and the second pulley 13, a reduction mechanism composed of a plurality of gears, or a clutch for connecting and disconnecting the driving force transmission path may be interposed. Further, the state of connection between the internal combustion engine 10 and the motor generator 20 may be composed of only a plurality of gears.

The output voltages of the high voltage battery 22 and the low voltage battery 24 are not limited. A battery with an output voltage lower than 48 V may be employed as the high voltage battery 22, or a battery with an output voltage higher than 48 V may be employed. The output voltage of the low-voltage battery 24 may not necessarily be lower than the output voltage of the high-voltage battery 22, the output voltage of both may be the same.

The type of the high-voltage battery 22 and the low-voltage battery 24 is not limited to the example of the above-described embodiment. For example, as the high-voltage battery 22 and the low-voltage battery 24, in addition to the lithium-ion battery, and lead-acid battery, a nickel metal hydride battery, a NAS battery, or a total fixed battery may be employed.

A motor generator that assists primarily the running torque of the internal combustion engine 10, and a motor generator that mainly generates power by torque from the internal combustion engine 10 may be provided separately. In this case, it is sufficient to start the internal combustion engine 10 using a motor generator for assisting the running torque of the internal combustion engine 10.

The vehicle 500 may not include the low-voltage battery 24. The starter 25A then obtains electric power from the high voltage battery 22.

The inverter 21 may be built into the housing of the motor generator 20.

The prohibition condition may include an example other than the above-described embodiment. For example, the prohibition condition may include a condition that the engine temperature of the internal combustion engine 10 is equal to or lower than a specified temperature set in advance. When the engine temperature of the internal combustion engine 10 is low, the viscosity of the lubricating oil of the internal combustion engine 10 increases. Accordingly, the sliding resistance of each component constituting the internal combustion engine 10 is increased. Therefore, when the engine temperature of the internal combustion engine 10 is low, it takes much energy to start the internal combustion engine 10. Under such circumstances, depending on the torque that the motor generator 20 can output, the sliding resistance of the internal combustion engine 10 may be too high to start the internal combustion engine 10 in the motor generator 20. According to this variation, the internal combustion engine 10 is started by the starter 25A rather than the motor generator 20 under low engine temperatures. Therefore, even when the engine temperature is low, it is possible to reliably start the internal combustion engine 10 without failing to start the internal combustion engine 10.

The control device 100 of the first embodiment, the processing of step S14 of the engine start control may be omitted. That is, the starting process may be executed regardless of whether or not the prohibition condition is satisfied. In the starting process in that case, the control device 100 drives the motor generator 20 to start the internal combustion engine 10. In this regard, the second embodiment may be similarly modified.

The control device 100 according to the first embodiment may determine whether or not there is a prohibition condition for prohibiting driving of the starter 25A prior to executing the process of step S12 of the engine start control. The prohibition condition for prohibiting the driving of the starter 25A is, for example, a condition such as "the starter 25A has failed". If the prohibition condition prohibiting the driving of the starter 25A is met, the control device 100 may drive the motor generator 20 to start the internal combustion engine 10. In this regard, the second embodiment may be similarly modified.

The control device 100 of the first embodiment, when detecting that the communication device 200 in the vehicle 500 is operated, the determination of step S11 even when receiving the starting request SR and the remote signal EX may be a negative determination. In this case, the control device 100 determines that the determination in step S13 is affirmative. Whether or not the communication device 200 is operated in the vehicle 500 is determined, for example, as follows.

The control device 100 is assumed to be capable of acquiring the position information of the vehicle 500 and the position information of the communication device 200. Then, the control device 100, with respect to the position information of the vehicle 500, in a state where the positional information of the communication device 200 is located within a predetermined range, and receives the starting request SR and the remote signal EX. In this case, the control device 100 considers that the communication device 200 has been operated in the vehicle 500.

Further, the vehicle 500 has a weight sensor on the sheet, in a state where the sensor detects a certain weight or more, the control device 100 assumes that it has received the starting request SR and the remote signal EX. In this case, the control device 100 considers that the communication device 200 has been operated in the vehicle 500. Other than these determination methods, if the control device 100 that the communication device 200 in the vehicle 500 is operated is detected, the determination of step S11 may be a negative determination. This point may be similarly changed in step S23 of the engine start control according to the second embodiment.

In a second embodiment, the remote signal EX may be omitted and the ignition switch 120 may communicate an occupant signal IP in association with the starting request SR. In this case, when the occupant signal IP is not associated with the starting request SR, the control device 100 may handle that the starting request SR is based on remote operation from the communication device 200.

What is claimed is:

1. A control device that is applied to a vehicle comprising:
an internal combustion engine that includes a crankshaft as an output shaft;
a motor generator that is able to apply torque to the crankshaft;
a starter for starting the internal combustion engine;
a battery for supplying electric power to the motor generator and the starter; and
a communicator that is able to communicate wirelessly with an external communication device, wherein:
the control device is able to execute a starting process for starting the internal combustion engine by driving either the motor generator or the starter when receiving a starting request; and
the control device is configured to start the internal combustion engine by driving the starter in the starting process when the starting request is based on a remote operation from the communication device outside the vehicle, and is configured to start the internal combustion engine by driving the motor generator in the starting process when the starting request is received in a state where an occupant is present in the vehicle.

2. The control device according to claim 1, wherein the control device is configured to start the internal combustion engine with the starter in the starting process, regardless of whether the occupant is present in the vehicle, when the vehicle satisfies a prohibition condition set in advance.

3. The control device according to claim 2, wherein:
the vehicle includes, as the battery, a first battery for supplying electric power to the motor generator, and a second battery for supplying electric power to the starter; and
the prohibition condition includes that a charge capacity of the first battery is equal to or less than a specified value set in advance.

4. The control device according to claim 2, wherein:
the vehicle further includes a temperature sensor for detecting an engine temperature of the internal combustion engine; and
the prohibition condition includes that the engine temperature is equal to or lower than a specified temperature set in advance.

5. The control device according to claim 1, wherein the control device is configured to be able to further execute a determination process of determining whether the starting request is based on the remote operation from the communication device after a specified time set in advance has elapsed since receiving the starting request.

* * * * *